United States Patent [19]

Kawano et al.

[11] Patent Number: 4,723,621
[45] Date of Patent: Feb. 9, 1988

[54] MOTORCYCLE

[75] Inventors: Akio Kawano; Kenji Honma; Tsutomu Sakuma, all of Saitama, Japan

[73] Assignee: Honda Giken Kogyo Kabushiki Kaisha, Tokyo, Japan

[21] Appl. No.: 924,293

[22] Filed: Oct. 29, 1986

[30] Foreign Application Priority Data

Oct. 30, 1985 [JP] Japan ................................ 60-244376
Oct. 30, 1985 [JP] Japan ................................ 60-244378

[51] Int. Cl.$^4$ ............................................ B62D 61/02
[52] U.S. Cl. .................... 180/219; D12/110; 180/222
[58] Field of Search ............... 180/219, 222, 311, 79, 180/219; D12/110; 280/275, 2.84

[56] References Cited

U.S. PATENT DOCUMENTS

| 4,265,329 | 5/1981 | de Cortanze | 180/219 |
| 4,401,316 | 8/1983 | Miyakoshi et al. | D12/110 X |
| 4,433,850 | 2/1984 | Miyakoshi et al. | 180/219 X |
| 4,526,249 | 7/1985 | Parker | 180/219 |

FOREIGN PATENT DOCUMENTS

199050  6/1923  United Kingdom ................ 180/219

*Primary Examiner*—James T. McCall
*Attorney, Agent, or Firm*—Bogucki, Scherlacher, Mok & Roth

[57] ABSTRACT

A motorcycle [1; 101; 201] includes an engine unit [2] disposed centrally in the motorcycle [1; 101; 201], front swing arms [14, 18] having rear ends operatively connected to the engine unit [2] for vertical swinging movement, with a steering arm [26] which supports a front wheel [15] being attached to the front ends of the front swing arms [14, 18], and a rear swing arm [33] supporting a rear wheel [34] on a rear end thereof and having a front end operatively connected to the engine unit [2] for vertical swinging movement. The motorcycle [1; 101; 201] further includes a front subframe [5; 205] detachably mounted on a front portion of the engine unit [2], the rear ends of the front swing arms [14, 18] being pivotally coupled to the front subframe for vertical swinging movement. The motorcycle [101] further includes a support frame [110] attached to the front subframe [5] and supporting a steering post [8], the support frame [110] having an air cleaner case [113]. The motorcycle [201] further includes a rear subframe [206] detachably mounted on a rear portion of the engine unit [2], the front end of the rear swing arm [33] being pivotally coupled to the rear subframe for vertical swinging movement, the rear subframe [206] having extensions [211, 212] supporting a rider's seat [242].

11 Claims, 10 Drawing Figures

MOTORCYCLE

CROSS REFERENCE TO RELATED APPLICATIONS

This application is related to commonly assigned copending applications Ser. No. 684,058 filed Dec. 20, 1984 for "MOTORCYCLE, AND BODY STRUCTURE THEREFOR" in the name of Minoru Morioka et al and Ser. No. 877,895 filed June 24, 1986 for "FRAMELESS MOTOR CYCLE" in the name of Akio Kawano.

BACKGROUND OF THE INVENTION

1. Field of the Invention:

The present invention relates to a motorcycle, and more particularly to a motorcycle having no body frame and including a front swing arm supporting a front wheel on a front end thereof and a rear swing arm supporting a rear wheel on a rear end thereof, the rear and front ends of the front and rear swing arms being pivotally mounted on an engine unit mounted centrally on the motorcycle.

2. Description of the Relevant Art:

Most of conventional motorcycles in general use employ so-called body frames.

There have been proposed in recent years frameless motorcycles including a front swing arm supporting a front wheel on a front end thereof and a rear swing arm supporting a rear wheel on a rear end thereof, the rear and front ends of the front and rear swing arms being pivotally mounted on an engine unit mounted centrally on the motorcycle. One such frameless motorcycle is disclosed in U.S. Pat. No. 4,265,329 issued May 5, 1981.

In the disclosed frameless motorcycle, front and rear plates are fixed to the front and rear ends of an engine unit disposed centrally on the motorcycle, and front and rear swing arms are vertically swingably attached to the front and rear plates, respectively. A steering plate is disposed on the front end of the front swing arm, and a rear wheel is rotatably supported on the rear end of the rear swing arm.

Since the motorcylcle disclosed in the above U.S. patent does not have any frame and front fork, it is lighter and has a lower center of gravity than motorcycles employing frames.

For servicing engine cylinders on such frameless motorcycles, it is preferable to remove the front and rear swing arms from the engine unit. It is however quite time-consuming to detach the front and rear plates from the engine unit because these plates are securely fixed to the engine unit. Therefore, a time-consuming and complex procedure is required to service the engine cylinders. Particularly, a front engine cylinder adjacent to the front swing arm near a steering mechanism cannot be serviced with ease. This problem manifests itself especially when a recently developed V-shaped engine having front and rear engine cylinders is to be serviced. It is suggested in the above U.S. patent that the plates may be replaced with protuberances integrally molded with the engine unit itself. With such an alternative, the front and rear swing arms are coupled to many protuberances on the engine unit. It would be more time-comsuming to detach the arms from the engine unit than to detach the arm together with the plates.

Another problem with the disclosed frameless motorcyle is that in the absence of a frame, particularly a main frame, a complicated structure is required to support a steering post and an air cleaner element.

Inasmuch as no main frame is used, a member which supports a rider's seat is attached to the engine unit. As a result, the structure around the engine unit is complex, preventing the engine unit from being serviced efficiently. The number of parts used is large. A portion of the engine unit to which the rider's seat supporting member is attached is required to be of an increased thickness, with the result that the engine unit itself, and hence the entire motorcycle are heavy.

The present invention has been made in an effort to solve the aforesaid drawbacks of conventional frameless motorcyles.

SUMMARY OF THE INVENTION

It is an object of the present invention to provide a motorcycle in which engine cylinders, particularly a front engine cylinder adjacent to a front swing arm near a steering mechanism, can easily be serviced.

Another object of the present invention is to provide a motorcycle having a simple structure which supports a steering post and an air cleaner case.

Still another object of the present invention is to provide a motorcycle in which the structure around an engine unit is simplified to permit the engine unit to be serviced efficiently, the number of parts used is not increased, and a rider's seat is supported without increasing the weight of the engine unit.

To achieve the above objects, there is provided a motorcycle including an engine unit disposed centrally in the motorcycle, front swing arms having rear ends operatively connected to the engine unit for vertical swinging movement, a steering arm mounted on a front end of the front swing arms and supporting a front wheel, the steering arm being operatively coupled to a steering handle, a front damper operatively interposed between the front swing arms and the engine unit, a rear swing arm supporting a rear wheel on a rear end thereof and having a front end operatively connected to the engine unit for vertical swinging movement, and a rear damper operatively interposed between the rear swing arm and the engine unit, wherein said motorcycle further includes a front subframe detachably mounted on a front portion of the engine unit, the rear ends of the front swing arms being pivotally coupled to the front subframe for vertical swinging movement, the front damper being operatively interposed between the front swing arms and the front subframe.

The motorcycle further includes a frame attached to the front subframe and supporting a steering post, the frame having an air cleaner case housing an air cleaner element therein.

The motorcycle further includes a rear subframe detachably mounted on a rear portion of the engine unit, the front end of the rear swing arm being pivotally coupled to the rear subframe, the rear subframe extending to a position above the rear wheel and having extensions supporting a rider's seat.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENT

Figure 1:
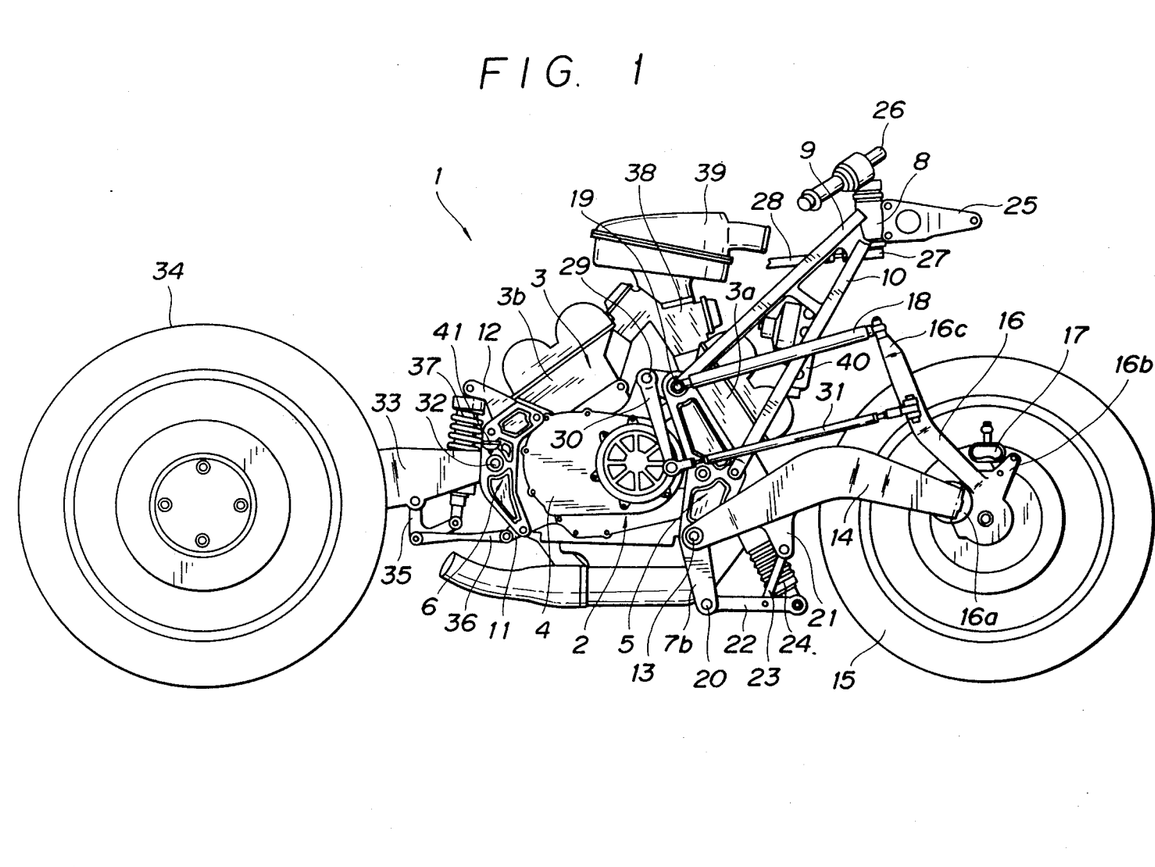
FIG. 1 is a side elevational view of a motorcycle according to a first embodiment of the present invention.

FIG. 1 shows a motorcycle, generally designated by the reference numeral 1, according to a first embodiment of the present invention. Various motorcycle components such as a headlight, a speedometer, a cowling, and other parts are omitted from illustration. The terms "front", "rear", "upper", "lower", "left", and "right" are used herein with respect to the motorcycle in normal usage.

The motorcycle 1 has an engine unit 2 disposed centrally in the motorcycle and doubling as a frame. The engine unit 2 comprises a V-shaped engine 3 having a front cylinder 3a inclined forwardly and a rear cylinder 3b inclined rearwardly, and a gear transmission case 4 disposed behind the engine 3. A front subframe 5 and a rear subframe 6 are detachably mounted on the engine unit 2 by means of bolts.

These subframes 5, 6 are constructed of steel plates. However, the subframes 5, 6 may be in the form of aluminum castings, integral castings of metal and reinforcing fibers, or laminated products of metal plates and fiber-reinforced panels.

Figures 2, 3, 4:
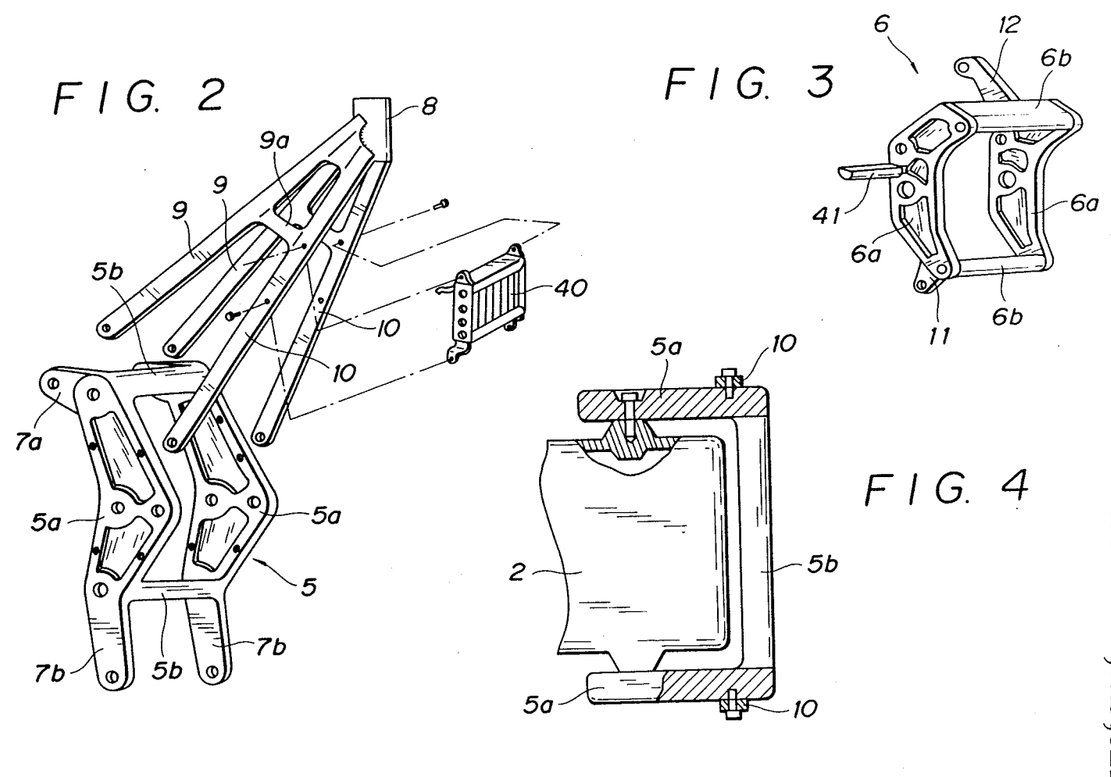
FIG. 2 is a perspective view of a front subframe of the motorcycle shown in FIG. 1.
FIG. 3 is a perspective view of a rear subframe of the motorcycle shown in FIG. 1.
FIG. 4 is a sectional plan view of a joint between the front subframe and an engine unit.

As shown in FIG. 2, the front subframe 5 comprises a pair of laterally spaced right and left bodies 5a connected to the respective opposite sides of the engine unit 2 (FIG. 4). The bodies 5a are interconnected by upper and lower cross members 5b extending transversely of the motorcycle 1 and integrally joined rigidly to the bodies 5a. The bodies 5a are curved along the front portion of the engine unit 2. Brackets 7a, 7b are integrally formed with the upper and lower ends, respectively, of the bodies 5a. Laterally spaced right and left pairs of front and rear stays 9, 10 extend rearwardly and downwardly from a steering post 8 and are coupled to upper and intermediate portions of the bodies 5a. The front and rear stays 9, 10 are joined to each other by reinforcing members 9a. A radiator 40 is connected between the front stays 10 by means of screws. Each of the bodies 5a of the front subframe 5 has an I-shaped cross section for high rigidity and small weight.

As illustrated in FIG. 3, the rear subframe 6 comprises a pair of laterally spaced right and left bodies 6a integrally joined rigidly by upper and lower cross members 6b extending transversely of the motorcycle. The bodies 6a are curved along the rear porton of the engine unit 2. A bracket 11 integrally projects rearwardly and downwardly from a lower portion of one (on the lefthand side in FIG. 3) of the bodies 6a, and a bracket 12 integrally projects rearwardly and upwardly from a central portion of the upper cross member 6b. Each of the bodies 6a is of an I-shaped cross section for higher rigidity and small weight.

A front lower swing arm 14 (FIG. 1) has a rear base portion supported on a shaft 13 for vertical swinging movement thereabout, the shaft 13 extending transversely between the bodies 5a of the front subframe 5. The base portion of the lower swing arm 14 is of a bifurcated shape extending in the transverse direction of the motorcycle. More specifically, the arm 14 is substantially in the shape of "h" as viewed from below. The arm 14 has a longitudinally intermediate portion disposed on the righthand side of the motorcycle (i.e., closer to the viewer of FIG. 1) and curved upwardly, and a distal end portion coupled by a joint member to a lower bracket 16a of a steering arm 16 which supports a front wheel 15.

The steering arm 16 has on its lower end a bracket 16b to which a brake caliper 17 is attached. The steering arm 16 is curved transversely to the righthand side (toward the viewer of FIG. 1) and extends rearwardly and upwardly. The steering arm 16 has an upper end 16c positioned outside of the circular profile of the front wheel 15 as viewed in side elevation. The upper end 16c of the steering arm 16 is pivotally coupled to the front end of a front upper swing arm 18.

The front upper swing arm 18 comprises a pair of laterally spaced right and left members. The right and left members are vertically swingably supported by a shaft 19 on the right and left bodies 5a, respectively, of the front subframe 5. The lower ends of the stays 9 extending downwardly from the steering post 8 are also supported by the shaft 19 on the front subframe 5. The front swing arms 14, 18 are vertically swingably coupled to the bodies 5a where they are joined to the cross members 5b.

A shaft 20 is supported transversely between the brackets 7b on the lower ends of the front subframe bodies 5a. Brackets 21 project downwardly from intermediate portions, respectively, of the right and left rear branches of the lower swing arm 14. A link 22 is pivotally supported on the shaft 20, and links 23 are pivotally supported on the brackets 21, respectively. The links 23 have lower ends coupled to an intermediate portion of the link 22. A damper 24 is coupled to and interposed between the front end of the link 22 and the front subframe 5. The arms 14, 16, 18, the links 22, 23, and the damper 24 jointly constitute a front wheel suspension mechanism having progressive damping characteristics.

To the steering post 8, there is attached a bracket 25 for supporting a headlight (not shown). A steering stem is rotatably disposed in the steering post 8 and has an upper end to which a steering handle 26 is secured and a lower end to which an arm 27 is secured. The arm 27 is coupled by a joint member to the front end of a steering rod 28 which is coupled by a joint member (not shown) to an arm 30 attached to the righthand end of a shaft 29 supported between the brackets 7a of the front subframe bodies 5a. The arm 30 is coupled by a link rod 31 to an intermediate portion of the steering arm 16. When the steering handle 26 is turned, the steering stem is angularly moved about its own axis to cause the arm 27 and the steering rod 28 to rotate the arm 30 clockwise or counterclockwise in FIG. 1 about the shaft 29. This swinging movement of the arm 30 is transmitted through the link rod 31 to the steering arm 16 to turn the same to the right or left, thereby steering the front wheel 15.

Between the bodies 6a of the rear subframe 6, there is supported the front end of a rear swing arm 33 for vertical swinging movement, the rear swing arm 33 being in the shape of inverted and reversed "h" as viewed in plan. The rear swing arm 33 has a longitudinally intermediate portion curved to the lefthand side of the motorcycle and a rear end on which the lefthand end of the axle of a rear wheel 34 is rotatably supported in a cantilevered fashion.

A bell-crank-shaped link 35 is pivotally coupled at one end to an intermediate portion of the rear swing arm 33. The bell-crank-shaped link 35 has an intermediate portion coupled by a link 36 to the bracket 11 on the body 6a of the rear subframe 6. A damper 37 is coupled to and interposed between the other end of the bell-crank-shaped link 35 and the bracket 12 on the upper cross member 6b of the rear subframe 6. The arm 33, the damper 37, and the links 35, 36 jointly constitute a rear wheel suspension mechanism having progressive damping characteristics.

A carburetor 38 is fixedly positioned between the front and rear cylinders 3a, 3b of the engine 3, and connected to an air cleaner 39 disposed above the carburetor 38.

A rider's seat (not shown) is supported on a stay (not shown) extending rearwardly and upwardly from the engine unit 2. A fuel tank (not shown) is disposed in covering relation to the air cleaner 39. The rider's seat may be supported on a stay extending rearwardly and upwardly from the rear subframe 6.

Foot steps 41 are attached to the bodies 6a of the rear subframe 6 for supporting a rider's feet.

In the motorcyle 1 thus constructed, the engine unit 2 is utilized as a frame, and the front subframe 5 supporting the front wheel suspension mechanism is detachably attached to the front portion of the engine unit 2. Therefore, the front half portion of the motorcycle 1 can be separated from the rear half portion thereof simply by detaching the front subframe 5 from the engine unit 2 for easy servicing of the engine cylinders 3a, 3b, particularly the front cylinder 3a. With the various front components being preassembled on the front subframe 5, the motorcycle 1 can be completed simply by attaching the front subframe 5 to the engine unit 2. Therefore, the assembly line for assembling motorcycles of the present invention can be designed with greater freedom, and preassembled parts can easily be carried when the motorcycle is assembled or disassembled. Since the rear wheel suspension mechanism is supported by the rear subframe 6, the rear wheel suspension mechanism can be attached to and detached from the engine unit 2 by attaching and detaching the rear subframe 6 to and from the engine unit 2.

Figures 5, 6, 7:
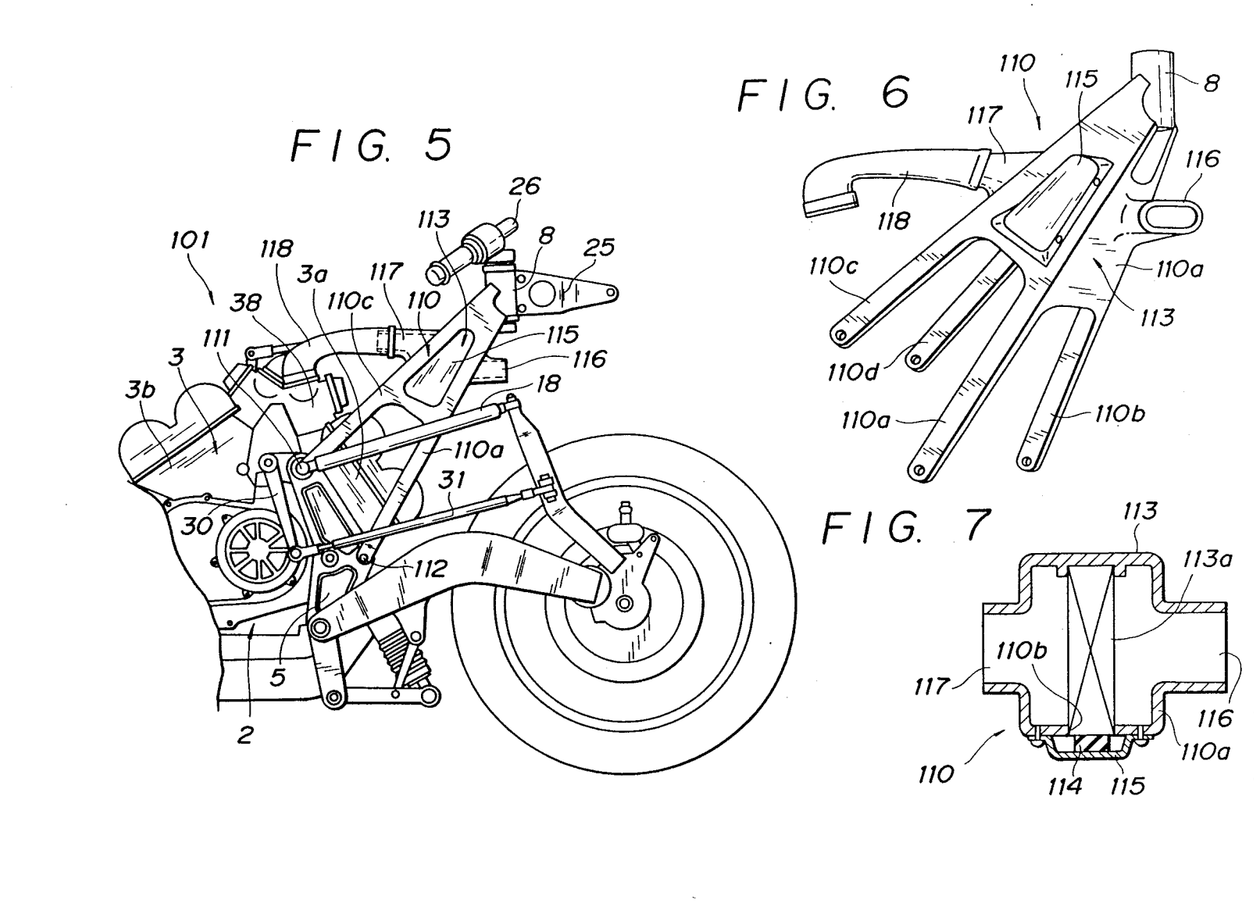
FIG. 5 is a side elevational view of a front half portion of a motorcycle according to a modification.
FIG. 6 is a perspective view of a steering post support frame of the motorcycle shown in FIG. 5.
FIG. 7 is a sectional plan view of an air cleaner case of the support frame illustrated in FIG. 6.

FIGS. 5 through 7 illustrate a motorcycle 101 according to a modification of the present invention. The rear subframe and associated components of the modified motorcycle 101 are omitted from illustration since they are identical to those of the motorcycle 1 according to the first embodiment. Some of the parts which are identical to those of the first embodiment are denoted by identical reference characters while others are not, and they will not be described in detail.

According to this modification, the steering post 8 is supported by a support frame 110 including an air cleaner case 113.

The front subframe 5 is detachably attached to the engine unit 2 of the motorcycle 101, the support frame 110 being coupled to the front subframe 5. As shown in FIG. 6, the support frame 110 is substantially in the form of a quadrangular pyramid having four stays or pillars, i.e., two right and left pairs of front and rear stays or pillars 110a, 110b, 110c, 110d, which extend rearwardly and downwardly from the steering post 8. The rear right and left pillars 110c, 110d have lower ends which, together with the front upper swing arm 18, are fixed to and supported on the upper end of the front subframe 5 by a shaft 111. The front right and left pillars 110a, 110b have lower ends fastened by a knock bolt 112 to an intermediate portion of the front subframe 5. The pillars 110a through 110d converge toward their upper ends, which support the steering post 8 thereon.

The support frame 110 has an upper half portion formed as a box 113 having an opening 115 defined in a righthand side wall thereof. An air cleaner element 113a (FIG. 7) is inserted through the opening 115 into the box 113, and thereafter the opening 115 is closed off by a cover 115a with a rubber mount 114 interposed between the air cleaner element 113a and the cover 115a. The box 113 thus serves as an air cleaner case 113. The air cleaner case 113 has an inlet port 116 projecting forwardly from a front side wall thereof and an outlet port 117 projecting rearwardly from a rear side wall thereof. The carburetor 38 disposed between the engine cylinders 3a, 3b is coupled to the outlet port 117 through a conical tube 118.

The motorcycle 101 according to the modification has the same advantages as those of the motorcycle 1 according to the first embodiment. In addition, the box 113 is formed as the air cleaner case 113 in the upper half portion of the steering post support frame 110 coupled to the front subframe 5. Therefore, the structure which supports the steering post 8 and the air cleaner element 113a is simplified while effectively utilizing a dead space. Since a portion of the support frame 110 is formed as the box 113, the support frame 110 is of high mechanical strength. Inasmuch as the air cleaner element 113a is not disposed in a space above the engine unit 2, another device may be installed in such a space.

Figure 8:
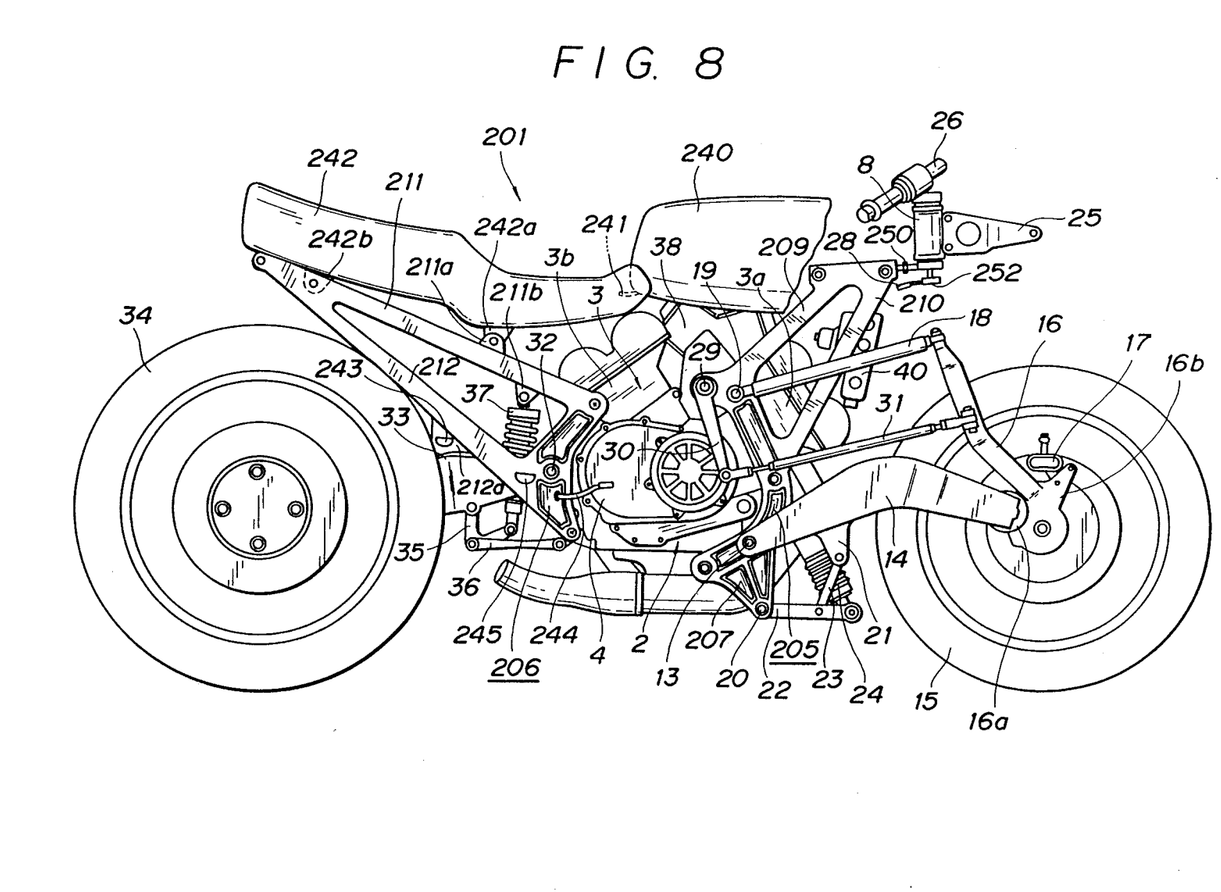
FIG. 8 is a side elevational view of a motorcycle according to a second embodiment of the present invention.
Figure 9:
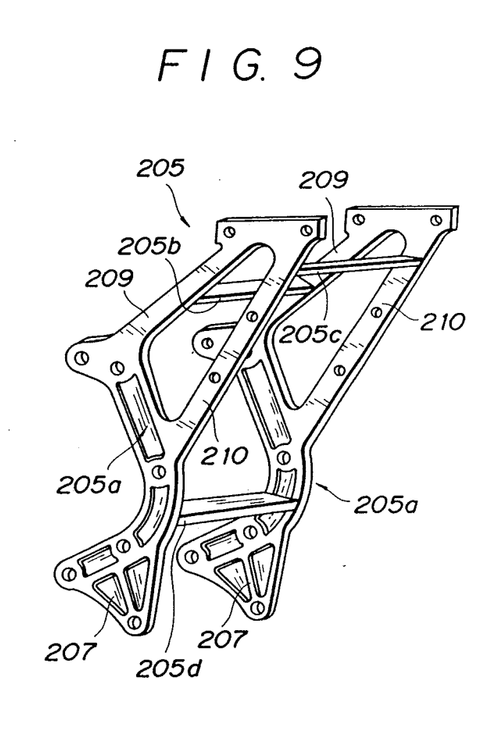
FIG. 9 is a perspective view of a front subframe of the motorcycle shown in FIG. 8.
Figure 10:
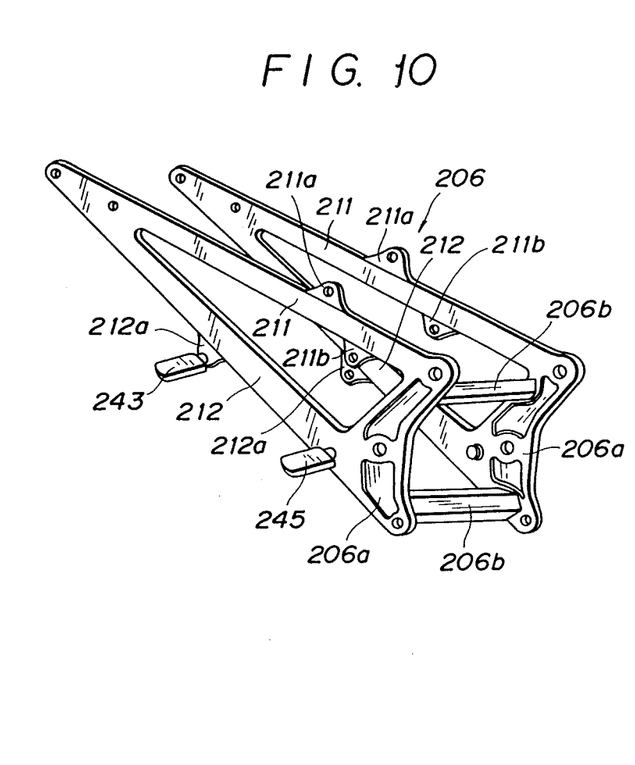
FIG. 10 is a perspective view of a rear subframe of the motorcycle shown in FIG. 8.

FIGS. 8 through 10 illustrate a tandem-seat-type motorcycle 201 according to a second embodiment of the present invention. Those parts in FIG. 8 which are identical to those of the first embodiment are designated by identical reference characters, and will not be described in detail.

A front subframe 205 constructed of steel plates is detachably fastened by bolts to the engine unit 2 of the motorcycle 201. As shown in FIG. 9, the front subframe 205 includes a pair of laterally spaced right and left bodies 205a curved along the front portion of the engine unit 2. Each of the bodies 205a is of an I-shaped cross section for high rigidity and small weight. A bracket 207 projects forwardly and downwardly from the lower end of each of the bodies 205a, the link 22 being vertically swingably coupled to the brackets 207. Steering post support frames 209, 210 project upwardly and forwardly from the upper end portion of each of the bodies 205a, and converge toward their upper ends. To the converged upper ends of the steering post support frames 209, 210, there is attached a bracket 250 (FIG. 8) which supports the steering post 8 on its front end and a fuel tank 240 on its rear end. The bodies 205a are rigidly interconnected by a cross member 205d extending transversely of the motorcycle 201. The support frames 209, 210 are rigidly interconnected by cross members 205b, 205c. Thus, the front subframe 205 serves as a unit having the bodies 205a and the steering post support frames 209, 210 as integral members. The front swing arm 14 is vertically swingably coupled to the bodies 205a where the cross member 205d is joined thereto.

A rear subframe 206 is detachably fastened by bolts to the rear portion of the engine unit 2. As shown in FIG. 10, the rear subframe 206 includes a pair of laterally spaced right and left bodies 206a curved along the rear portion of the engine unit 2 and integrally coupled by upper and lower cross members 206b. Each of the bodies 206a has an I-shaped cross-sectional shape for high rigidity and small weight. Upper and lower stays 211, 212 extend rearwardly and upwardly from upper and lower portions of each of the bodies 206b to a position above the rear wheel 34 (FIG. 9), the upper and lower stays 211, 212 converging toward their rear ends. Brackets 211a project upwardly from upper edges of the upper stays 211, respectively, for supporting a rider's seat bottom plate. Brackets 211b project downwardly from lower edges of the upper stays 211, respectively, for supporting the upper end of the rear damper 37. Foot steps 245 are attached to front portions of the lower stays 212, respectively, for a driver's feet, and foot steps 243 for a rear rider's feet are attached to respective brackets 212a projecting downwardly from lower edges of the lower stays 212 at their longitudinally intermediate portions. A brake pedal 244 is operatively attached to the right body 206a slightly rightwardly of the foot step 245.

A steering stem is rotatably disposed in the steering post 8. An arm 252 is secured to the lower end of the steering stem and coupled by a joint member (not shown) to the front end of the steering rod 28. The steering arm 28 is coupled by a joint member (not shown) to the arm 30 connected to the righthand end of the shaft 29 supported between the upper portions of the bodies 205a of the front subframe 205.

An air cleaner (not shown) is positioned above the carburetor 38 between the engine cylinders 3a, 3b and disposed in a recess defined in a lower portion of the fuel tank 240. The fuel tank 240 has on its rear end an engagement member 241 which supports the front end of the bottom plate (not shown) of a rider's tandem seat 242. Brackets 242a project downwardly from the rider's seat bottom plate at opposite sides of a longitudinally intermediate portion thereof and are secured to the brackets 211a, respectively, on the upper stays 211 of the rear subframe 206. Brackets 242b also project downwardly from the rider's seat bottom plate at opposite sides of a rear portion thereof and are secured to converging rear portions of the stays 211, 212 of the rear subframe 206.

The motorcycle 201 according to the second alternative embodiment is as advantageous as the motorcycle 1 of the first embodiment. In the second alternative embodiment, furthermore, the rear wheel suspension mechanism 33, 35, 36, 37 and the rider's seat 242 are supported on the rear subframe 206 attached to the rear portion of the engine unit 2. Consequently, it is not necessary to install a separate seat support on the engine unit 2. This simplifies the structure around the engine unit 2, which can easily be serviced. The number of components required is small. The weight of the engine unit 2 is not increased because the engine unit 2 is not required to have an increased thickness which would otherwise result from the necessity of installing a separate seat support thereon.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A motorcycle including an engine unit disposed centrally of the motorcycle, a front subframe detachably mounted on a front portion of said engine unit, front swing arms having rear ends operatively coupled to the front subframe for vertical swinging movement, a steering arm mounted on front ends of the front swing arm being operatively coupled to a steering handle, a front damper disposed between said front swing arms and operative coupled to damped motion of the front swing arms relative to said front subframe, a rear swing arm supporting a rear end operatively coupled to the engine unit for vertical swinging movement, and a rear damper operatively coupled to dampen motion between said rear swing arm and the engine unit.

2. A motorcycle according to claim 1, further including a support frame attached to said front subframe and supporting a steering post, said support frame hving an air cleaner case housing an air cleaner element therein.

3. A motorcycle according to claim 1, further including a rear subframe detachably mounted on a rear portion of said engine unit, the front end of said rear swing arm being pivotally coupled to said rear subframe for vertical swinging movement, said rear subframe extending to a position above the rear wheel and having extensions supporting a rider's seat.

4. A motorcycle according to claim 1, further including a rear subframe detachably mounted on a rear portion of said engine unit, the front end of said rear swing arm being pivotally coupled to said rear subframe for vertical swinging movement, said rear damper being operatively interposed between said rear swing arm and said rear subframe.

5. A motorcycle according to claim 4, wherein foot steps are attached to said rear subframe.

6. A motorcycle according to claim 1, wherein said front subframe has a pair of bodies attached to opposite sides, respectively, of said engine unit, and a cross member rigidly interconnecting said bodies, said rear end of said rear swing arm being pivotally coupled to said bodies for vertical swinging movement.

7. A motorcycle according to claim 6, wherein said bodies of said front subframe are fastened by bolts to the opposite sides of said engine unit, said cross member extending transversely of the motorcycle in front of said engine unit.

8. A motorcycle according to claim 7, wherein one of said front swing arms is pivotally coupled to said bodies of said front subframe for vertical swinging movement, at positions where said cross member is joined to said bodies.

9. A motorcycle according to claim 8, wherein said front swing arms include an upper swing arm and a lower swing arm with the front ends connected to said steering arm and the rear ends pivotally connected to said bodies of said front subframe for vertical swinging movement.

10. A motorcycle according to claim 1, further including support frames attached to said front subframe and supporting a steering post, and a radiator attached to said support frames.

11. A motorcycle according to claim 10, wherein said support frames are integral with said front subframe.

* * * * *